United States Patent [19]
Shih et al.

[11] Patent Number: 6,008,144
[45] Date of Patent: Dec. 28, 1999

[54] WINDOW SHUTTER FOR LASER ANNEALING

[75] Inventors: Chu-Jung Shih; I-Min Lu, both of Hsinchu, Taiwan

[73] Assignee: Industrial Technology Research, Hsin-Chu, Taiwan

[21] Appl. No.: 09/017,133

[22] Filed: Feb. 2, 1998

[51] Int. Cl.[6] .......................... H01L 21/26; H01L 21/324
[52] U.S. Cl. .......................... 438/795; 438/166; 438/487; 438/905; 250/492.2; 359/507; 359/509
[58] Field of Search .............................. 438/30, 166, 308, 438/487, 795, 905, 945, FOR 138, FOR 155, FOR 333, FOR 334, FOR 407, FOR 418, FOR 419, 492.1; 250/492.2; 359/509, 507

[56] References Cited

U.S. PATENT DOCUMENTS

| | | | |
|---|---|---|---|
| H1637 | 3/1997 | Offord et al. | 437/173 |
| 4,184,078 | 1/1980 | Nagel et al. | 378/34 |
| 4,347,785 | 9/1982 | Chase et al. | 378/119 |
| 4,408,338 | 10/1983 | Grobman | 378/34 |
| 4,439,259 | 3/1984 | Flint | 156/245 |
| 4,897,520 | 1/1990 | Carter et al. | 219/121.68 |
| 5,153,607 | 10/1992 | Ichinokawa | 346/108 |
| 5,357,365 | 10/1994 | Ipposhi et al. | 359/205 |
| 5,561,081 | 10/1996 | Takenouchi et al. | 437/174 |
| 5,869,803 | 2/1999 | Noguchi et al. | 219/121.62 |
| 5,946,089 | 8/1999 | Duer | 356/318 |

*Primary Examiner*—Mary Wilczewski
*Attorney, Agent, or Firm*—George O. Saile; Stephen B. Ackerman

[57] ABSTRACT

A laser scanning system suitable for annealing applications is described. The problem of keeping the window (through which the laser shines into the system) clean, even though the laser ejects a considerable amount of debris, has been solved by inserting a moveable shutter close to the window between it and the substrate. The center portion of the shutter is an insert of optical quality quartz that is just large enough to allow the laser beam to pass through unimpeded and undiverted. By moving the beam and the shutter in concert it is ensured that the beam always passes through the insert. Most of the debris ejected by the laser as a side effect of its operation is trapped on the shutter. Relatively little material ends up on the quartz insert but when sufficient has accumulated there, the insert can be replaced at much lower cost than replacing the window. By moving the beam back and forth together with movement of the substrate, the entire area of the film on the substrate may be scanned by the beam. In a second embodiment, the quartz insert is omitted and an open slit left in its place. With this arrangement debris will eventually accumulate on the window but at a greatly reduced rate relative to an unprotected window.

6 Claims, 3 Drawing Sheets

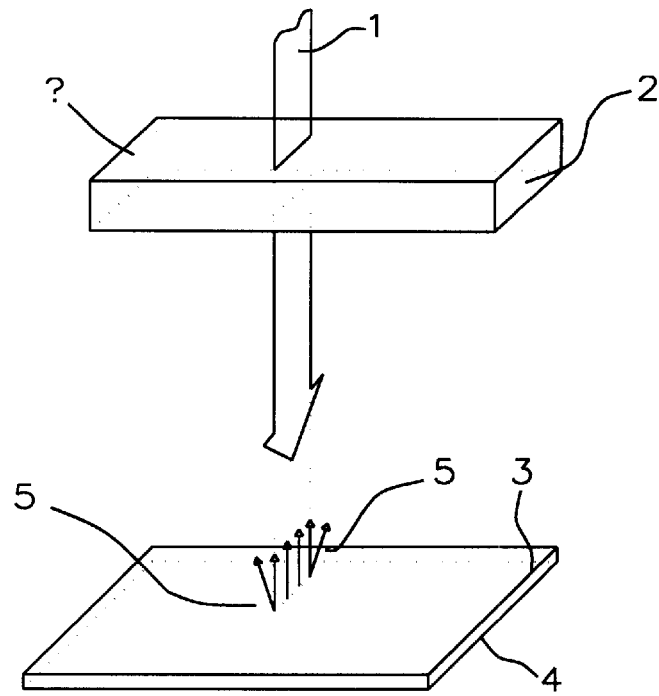
FIG. 1 – Prior Art
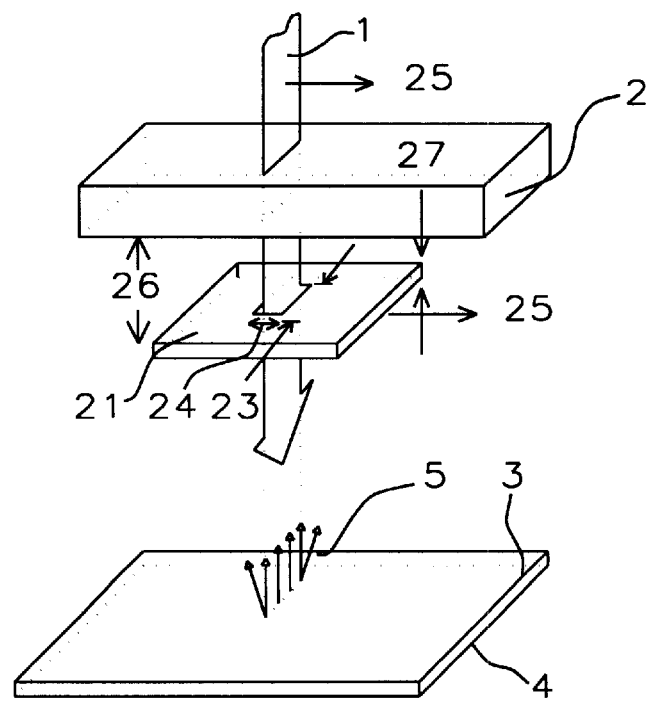
FIG. 2

WINDOW SHUTTER FOR LASER ANNEALING

BACKGROUND OF THE INVENTION

1. Field of the Invention

The invention relates to the general field of laser annealing with particular attention to the problem of shielding the laser system from laser emitted debris.

2. Description of the Prior Art

As part of the manufacture of integrated circuits and similar devices, a need may arise to recrystallize an amorphous layer, either in its entirety or, more likely, in selected areas only. This can conveniently be accomplished by means of a laser beam which can be directed to scan an entire area or may be limited to selected areas as desired. Since no diffusion is involved, recrystallization will take place very rapidly once a sufficiently high temperature has been reached. Excimer lasers, which provide very high energy densities during short duration pulses, are well suited for this because such brief, high energy pulses allow small areas to be rapidly heated to high temperatures with little effect on the immediate surroundings.

One side effect of this high concentration of energy, even though the time be brief, is that the surface being irradiated by the laser beam tends to emit debris in the form of evaporant and/or finely divided particulate matter. This is schematically illustrated in FIG. 1 where laser beam 1 is seen to be directed to shine on layer 3 on substrate 4. As a side effect of the beam's interaction with layer 3 the aforementioned debris, shown schematically as arrows 5, is ejected. Some of this debris ends up on the underside of window 2. The latter, which is obviously transparent to the laser radiation being used, is needed either to protect the laser optics directly or, more commonly, because the layer 3 is inside an enclosure that may be evacuated or filled with an inert gas, so window 2 forms part of the top side of such an enclosure.

If the underside of window 2 is unprotected, the accumulation of laser debris on its underside will soon render it unsuitable for its intended purpose because it will become opaque to the laser radiation and/or will lose its optical flatness and smoothness. Thus, a number of approaches to protecting the laser admission window may be found in the prior art. For example, Carter et al. (U.S. Pat No. 4,897,520 January 1990) describe a vacuum scoop that removes the debris as it is generated. This approach is clearly unsuitable for use in a vacuum environment. Offord et al. (U.S. H1637 March 1997) minimize the emission of debris by protecting all surfaces not intended for laser irradiation with a layer of aluminum which reflects the beam away. This method is not suitable for processes in which large areas are required to interact with the laser.

Flint (U.S. Pat No. 4,439,259 March 1984) uses a disposable shield made from epoxy and teaches how to make such a shield, including a proper mount for it, at low cost but with the desired optical quality needed for sensitive laser operations. Ichinowkawa (U.S. Pat No. 5,153,607 October 1992) describes a laser shutter mechanism that is interlocked to close whenever a laser printer is opened, as the laser may have been inadvertently left on.

Takenouchi et al. (U.S. Pat. No. 5,561,081 October 1996) describe the use of a laser for annealing semiconductor layers. They minimize the amount of emitted debris by preheating their films and by using a laser beam that has a rectangular cross-section similar to the beam shown in FIG. 1.

The present invention take a different approach from all of the above and describes a shielding system that is long lasting but nevertheless highly effective.

SUMMARY OF THE INVENTION

It has been an object of the present invention to provide a method and apparatus that allow a laser to be used, in conjunction with a transparent window, for an extended period of time without the need to clean or change the window, even though ejection of debris is a side effect of the laser operation.

Another object of the invention has been that said apparatus be low cost to manufacture and maintain.

A further object of the invention has been that said method be easy to apply and involve minimum disruption of currently used methods for operating the laser.

These objects have been achieved by inserting a moveable shutter close to the window between it and the substrate. The center portion of the shutter is a quartz insert that is just large enough to allow the laser beam to pass through unimpeded and undiverted. By moving the beam and the shutter in concert it is ensured that the beam always passes through the insert (and is therefore unaltered). Most of the debris ejected by the laser as a side effect of its operation is trapped on the shutter. Relatively little material ends up on the quartz insert but when sufficient has accumulated there, the insert can be replaced at much lower cost than replacing the window. By moving the beam back and forth together with movement of the substrate, the entire area of the film on the substrate may be scanned by the beam. In a second embodiment, the quartz insert is omitted and an open slit left in its place. With this arrangement debris will eventually accumulate on the window but at a greatly reduced rate relative to an unprotected window.

BRIEF DESCRIPTION OF THE DRAWINGS

FIG. 1 shows a laser scanning apparatus of the prior art in which a laser beam passes directly through a transparent window to a substrate.

FIG. 2 shows the apparatus of the present invention wherein a moveable shutter with a beam-sized laser transparent area is inserted between the window and the substrate.

DESCRIPTION OF THE PREFERRED EMBODIMENTS

Figure 3:
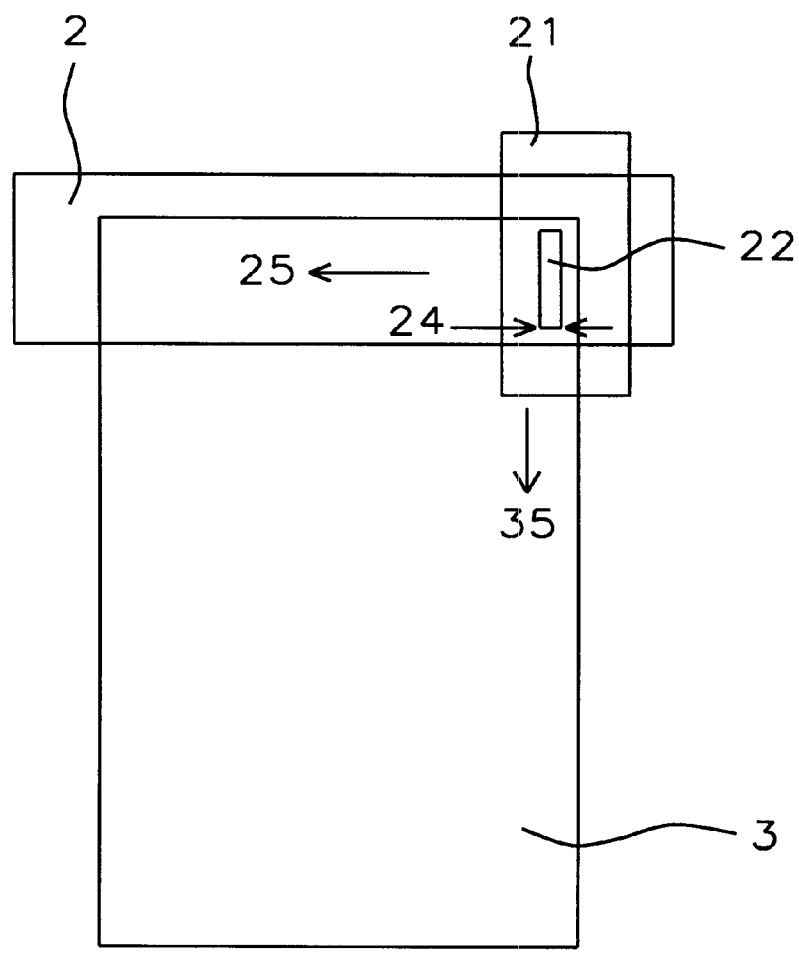
FIG. 3 is a plan view showing the window, the shutter, and the substrate.

Reference to FIG. 2 will reveal the method of the present invention as well as the apparatus used to implement it. As in the prior art, excimer laser beam 1 enters the enclosure by passing through transparent window 2, usually made of optical quality quartz, and then shining onto layer 3 on substrate 4, resulting in the emission of debris 5. The invention is of a general nature so that layer 3 could be any material but preferred materials that have been used include amorphous silicon, polysilicon, and doped silicon. There is a particular interest in amorphous silicon layers because they are suited for the formation of thin film transistors which, in turn, have found application in the active matrices of Liquid Crystal Displays. For the laser beam, we have found a plane view of between about 2 and 60 mm. by between about 2 and 60 mm. to be well suited for the applications addressed by the present invention.

The novel feature of the present invention is the insertion of moveable shield, or shutter, 21 between window 2 and layer 3. Located in approximately the center of shutter 21 is quartz insert 22 whose length 23 is chosen to be slightly longer than the length of beam 1 while its width 24 is slightly greater than the width of the beam. Typically the dimensions of the insert have been between about 60 and 65 mm. in length and between about 2 and 2.5 mm. in width.

Thus, once they have been properly aligned, the beam will pass through the shutter without any attenuation or diversion. With this arrangement, none of ejected material 5 will reach the underside of window 2. Only a small fraction of the material that lands on shutter 21 will end up on quartz insert 22. Eventually, insert 22 will need to be replaced but the cost of doing so will be much less than replacing window 2. For the material of the shutter we have preferred to use a low cost material such as glass or soda lime glass.

In a second embodiment of the invention, the quartz insert is omitted, leaving in its place a slit in the center of the shutter. The amount of ejected material that passes through the slit and ends up on the underside of 2 will be a function of the separation between 3 and 21 or, for a fixed distance between 2 and 3, a function of separation distance 26 between shutter 21 and window 2. The amount that gets past the slit will also be a function of the slit depth which in this embodiment of the invention is the same as the thickness 27 of shutter 21.

Although this embodiment requires the eventual replacement of window 2, it saves on the cost of the quartz inserts and also eliminates the need to periodically replace the quartz inserts.

In practice, 21 is located as close as possible to the underside of 2 while retaining its freedom to move unimpeded relative to 2. Thus it will be seen that FIG. 2 is schematic in nature and represents an exploded view of the apparatus. Typically separation distance 26 will be between about 0.5 and 1 mm. but this will vary according to the particular application.

An important feature of the invention is that means (not shown) are provided that enable the beam and the shutter to move in concert so that as the beam is moved in direction 25, shutter 21 moves in synchrony with it and beam 1 always passes unimpeded through slit 22. While, in principle, 25 could be any direction in the plane of 2, in practice 25 is chosen so that, as shown in FIG. 3, 25 parallels the short edge of 4 (and consequently of 3). Once the beam has performed a single pass along 25, it (together with slit 22) is moved, relative to 3, in direction 35 at right angles to 25. Although, in principle, this relative motion along 35 could be accomplished by moving beam 1 and shutter 21, in practice the relative motion is accomplished by moving substrate 4 (and hence layer 3). Thus, by a combination of motion along 35 and motion back and forth along 25, the entire area of layer 3 gets scanned by the beam.

Figure 4:
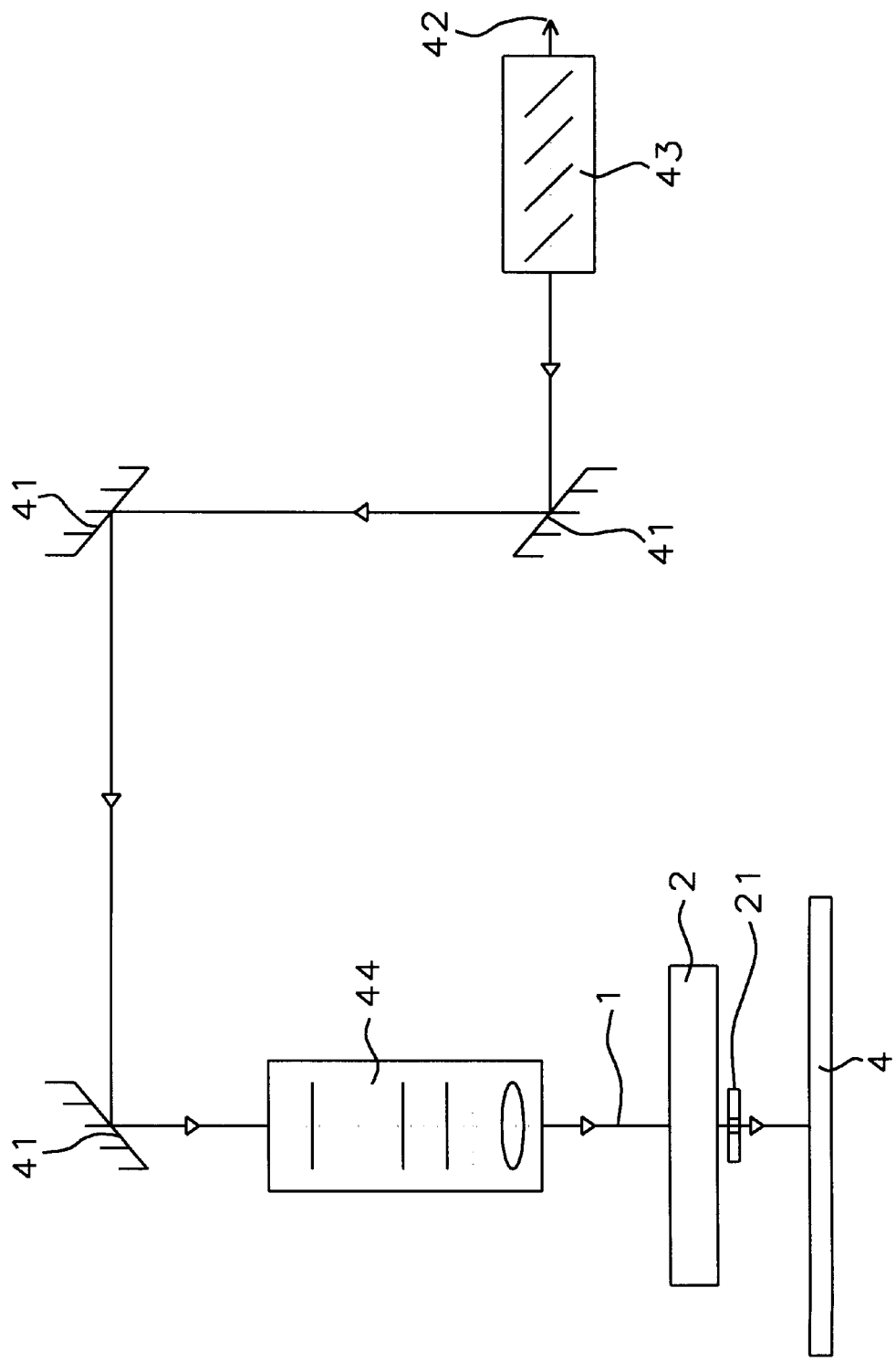
FIG. 4 is a schematic view of the overall system.

A schematic view of the total system is presented in FIG. 4. Light from the excimer laser pointed to by arrow 42 is first passed through attenuator 43 to control its intensity. A series of mirrors 41 are used to correctly align and/or move the beam which, after passing through homogenizer 44, has been shaped into the desired rectangular cross-section, emerging as beam 1 which passes through window 2 as well the slit in shutter 21 before reaching substrate 4.

While the invention has been particularly shown and described with reference to the preferred embodiments thereof, it will be understood by those skilled in the art that various changes in form and details may be made without departing from the spirit and scope of the invention.

What is claimed is:

1. A method for annealing a layer of material, comprising:
   providing a laser beam whose cross-section is a rectangle having a first length and a first width;
   providing an enclosed annealing chamber, including a laser transparent window having an inside surface and a thickness;
   providing a shutter that includes a laser transparent area having a second length and a second width, and placing the shutter a distance below said inside surface; then
   the sequential steps of:
   (a) placing said layer inside the chamber and opposite the window;
   (b) positioning the laser beam and the transparent area so that the beam shines through the window and the transparent area onto said layer, thereby producing an annealing effect in the layer;
   (c) moving the beam and the shutter in concert in a first direction, perpendicular to the beam and parallel to the layer, whereby the beam always passes through said laser transparent area and scans the layer of material in said first direction;
   (d) moving the layer relative to the beam and shutter in a second direction, that is parallel to the layer and perpendicular to the first direction; and
   (e) then repeating steps (c) and (d) until all of the layer has been scanned.

2. The method of claim 1 wherein the laser beam is generated by an excimer laser.

3. The method of claim 1 wherein the layer of material is selected from the group consisting of amorphous silicon, polysilicon, and doped silicon.

4. The method of claim 1 wherein the distance of the shutter below said inside surface is between about 0.1 and 150 mm.

5. The method of claim 1 wherein the layer is part of a thin film transistor.

6. The method of claim 5 wherein said thin film transistor is part of an active matrix in a liquid crystal display.

* * * * *